United States Patent [19]

Tan

[11] Patent Number: 4,502,137

[45] Date of Patent: Feb. 26, 1985

[54] DIGITAL SIGNAL TRANSMITTING METHOD

[75] Inventor: Yoichi Tan, Kanagawa, Japan

[73] Assignee: Fuji Xerox Co., Ltd., Tokyo, Japan

[21] Appl. No.: 359,011

[22] Filed: Mar. 17, 1982

[30] Foreign Application Priority Data

Mar. 19, 1981 [JP] Japan .................................. 56-38714

[51] Int. Cl.³ .............................................. H04J 3/14
[52] U.S. Cl. ..................................................... 370/85
[58] Field of Search ........................ 370/85, 94, 99, 86

[56] References Cited

U.S. PATENT DOCUMENTS 4,096,355  6/1978  Rothauser et al. .................... 370/94
4,161,786  7/1979  Hopkins et al. ....................... 370/85

Primary Examiner—Douglas W. Olms
Assistant Examiner—Wellington Chin
Attorney, Agent, or Firm—Sughrue, Mion, Zinn, Macpeak, and Seas

[57] ABSTRACT

A multipoint communication system has a plurality of stations connected to a cable. All stations transmit data in packets of information within blocks subdivided in a frame which has a repetitive period. Frame and block synchronization is based on a key station's packet being transmitted within the first block of each frame. Other stations synchronize their frame and block timings to the key station packet. Any station in the system can take over as the key station.

9 Claims, 3 Drawing Figures $b_1$ ---- BACKWARD GUARD TIME ⎫ GUARD TIME ($b_1 + b_9$)
$b_9$ ---- FORWARD GUARD TIME ⎭

$b_2$ ---- PREAMBLE
$b_3$ ---- START FLAG
$b_4$ ---- ADDRESS FIELD
$b_5$ ---- CONTROL FIELD ⎱ OVERHEAD (ADDITIONAL BITS)
$b_7$ ---- CHECK FIELD
$b_8$ ---- END FLAG $b_6$ ---- DATA UNIT

DIGITAL SIGNAL TRANSMITTING METHOD

BACKGROUND OF THE INVENTION

This invention relates to a digital signal transmitting method for performing the transmission of data by time division multiplex by using a communicating cable.

With the increase in the types and uses of computers and the development of digital signal processing techniques, a significant amount of attention has been directed to data communication of the type wherein communicating systems and data processing systems are combined to perform on-line information processing. In particular, for small scale communication systems, such as would be used for a single company office or a local government having multiple offices, a local area network system which uses a packet form of communication and which communicates via cable, such as a coaxial cable, has attracted a lot of attention because of its economy, reliability and high transmitting efficiency.

In a packet type communicating system, the communicating cable for performing bidirectional transmission of information is installed at a laboratory or the like, and the multiple personal stations are connected thereto. The transmission of messages, divided into data blocks of 1000-2000 bits, for example, is performed from the respective personal stations. The address and the other overhead bits such as serial number, are added to the message. In such a communicating system, the network itself does not have any controlling function but is a passive medium, and the control function is completely dispersed to the respective personal stations. Accordingly, the personal stations start transmitting their respective messages in packet form after they confirm the vacancy of the transmitting path. When a collision occurs between packets from two stations, both stations stop their transmission. The stations which stopped the transmission attempt to retransmit their messages after waiting a random amount of time.

In such a communication system, not only do the users at the respective stations have access to a central computer, but also they can use the hardware and software resources located at the other stations. That is to say, in this communicating system, the units which have been centralized to a central large-sized computer in a time sharing system (TSS), such as a high-speed and/or; printer high quality, a large volume file, can be used in the condition as if they were dispersed to the respective stations. Accordingly, not only is there a saving of resources and an improvement of efficiency, but also the development of large software systems by the mutual utilization of program and data is made possible.

In a communicating system of the type described, the order of priority among the personal stations for using the communicating path is not given, but all stations have equal right of access to the communicating path. Accordingly, master or slave classes, which are often found among the stations in other communicating systems, are not found in the equal access type systems, and communication between the connected arbitrary stations is made possible. Further, the transmitting path, such as a coaxial cable, is completely composed of passive circuitry, so that a highly reliable system can be easily formed.

As mentioned above, although the communicating system has various merits, the collision of packets of information on the same transmitting path possibly occurs because the respective personal stations arbitrarily start their transmission of data. The collision of packets increases as the frequency of use of the transmitting path increases.

In order to resolve the problem, a signal transmitting method known as Priority Ethernet or Reservation Ethernet has been proposed. In the Priority Ethernet method, the order of priority of the transmission of signals by the personal stations is assigned to a preamble in the packet. If a collision of packets occurs, the packet of higher priority is transmitted prior to the other one. In the Reservation Ethernet method, a master station for designating modes is assigned at all times. Thereby, whether or not there is a signal to be transmitted by each of the personal stations and the quantity of information to be transmitted are confirmed in a reservation mode. And according to the result, the order of packets to be transmitted by the personal stations are decided in each frame and the transmission of signal is time divisionally performed in the transmission mode.

However, according to the proposed former signal transmitting method, the problem of the scattering in the transmission delay time caused by the collision of the packets of the same priority, has not yet been resolved. Accordingly, the method is unsuitable for real time transmission which attaches importance to the corresponding relation of transmission and reception in real time, such as conversation-type aural communication. Further, according to the latter signal transmitting method, the above-mentioned equality among the personal stations is lost by the existence of the master station. That is, according to this method, if same failure occurs at the master stations, the data transmission from any station can not be performed, and the reliability of the entire system is degraded in this sense.

SUMMARY OF THE INVENTION

The present invention has been made with a view towards overcoming the above problems, and the purpose of this invention is to provide a digital signal transmitting system and method to perform real time transmission without losing equality among the personal stations while maintaining high reliability.

In accordance with this invention, the frame, which is periodically repeated on a time base, is further divided into a plurality of blocks, and the opportunity of transmitting of packets is given to the personal stations by the unit of the block. Therefore, not only do the personal stations have equality in using vacant blocks but also when the personal station monopolizes the appointed block through the time necessary for the signal transmission, the real time transmission can be performed because the opportunity of signal communication is periodically given by every repeating of frames.

DETAILED DESCRIPTION OF THE INVENTION

Hereinafter the present invention will be explained in detail in reference to an exemplary embodiment.

Figure 1:
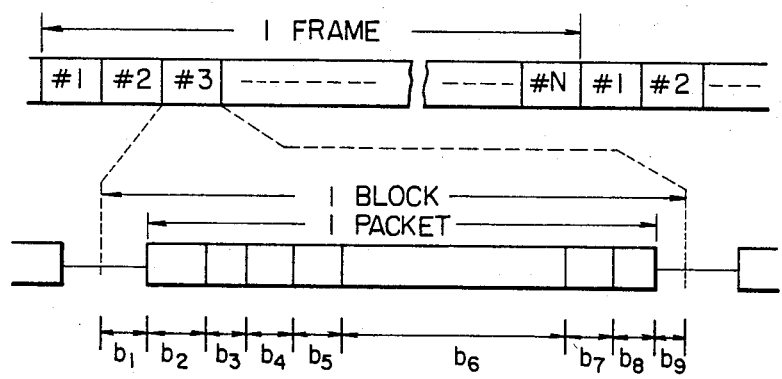
FIG. 1 is a block diagram illustrating the composition of a frame and block format in accordance with the invention.

FIG. 1 illustrates the format of the frame in the exemplary embodiment of this invention. The frame, which is periodically repeated on a time base, is composed of N blocks, that is, #1–#N. Each block comprises guard time b1, b9, overhead bit b2–b5, b7, b8 necessary for forming the packet such as the address and flag, and information unit b6. In this invention, the guard time means a vacant bit array for preventing the situation that the adjacent packets are partially overlapped by the delayed time generated when the packets of the respective blocks are transmitted on the coaxial cable. There are two kinds of guard times, that is backward guard time b1 for protecting the packet positioned at the back thereof, and forward guard time b9 for protecting the packet positioned in front thereof. The sum of bits of the backward guard time b1 and the forward guard time b9 is g bits, and hereinafter the guard time (b1+b9) is indicated by $\tau_g$.

Figure 2:
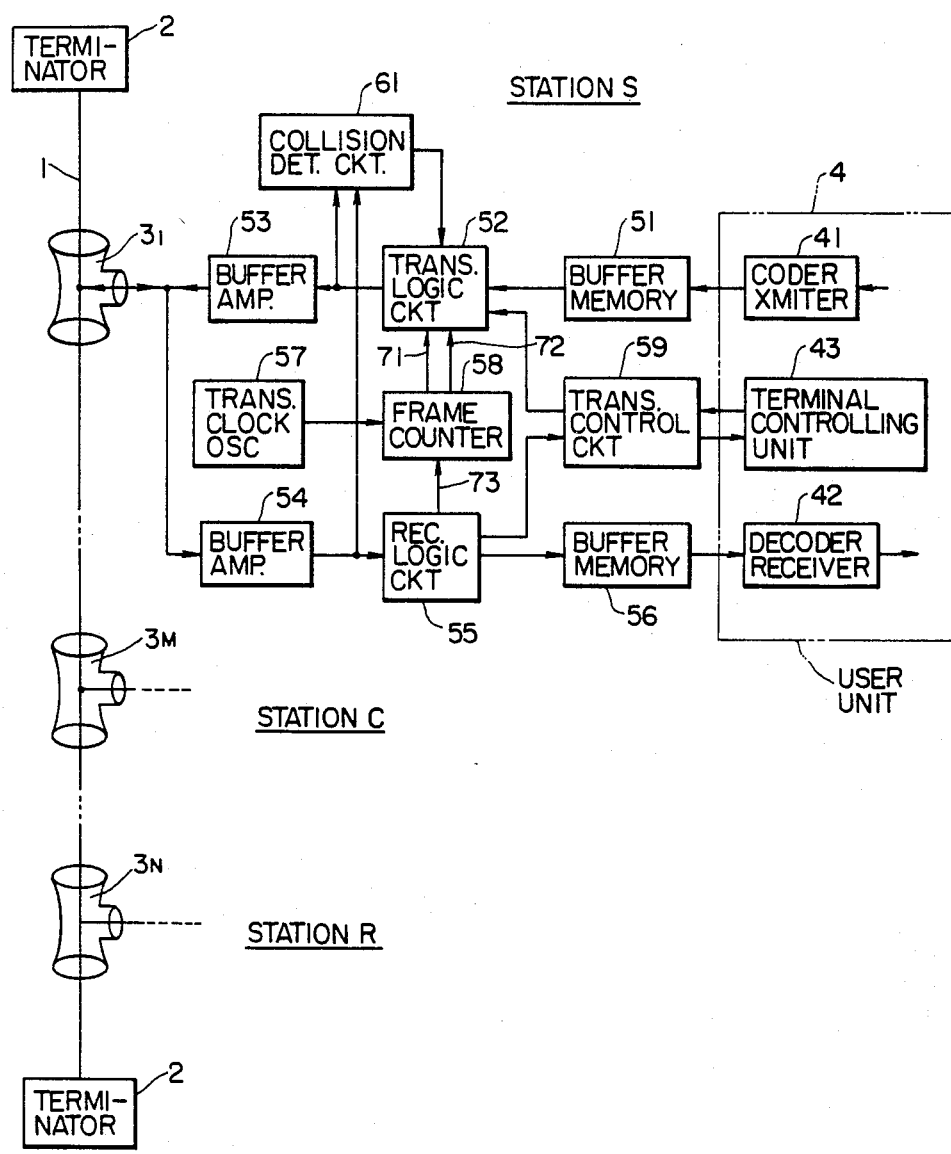
FIG. 2 is a block diagram illustrating a schematic digital signal transmitting system in accordance with the invention.

FIG. 2 illustrates a communicating system for transmitting the digital signal of the frame format explained above. Both sides of the coaxial cable 1 installed as the transmitting path in this communicating system are connected to a respective terminator 2 for impedance matcher having a resistance value equal to the characteristic impedance of the cable. The respective stations are connected to the coaxial cable 1 through T connectors (taps) $3_1$–$3_N$. All stations basically have the same composition, therefore only the main portion of station S, connected to the T connector $3_1$, is shown in the drawing. Each personal station includes a user unit 4 connected to a computer and/or telephone. The user unit 4 is provided with a transmitter (coder) 41 for transmitting a packet of digital signals to other stations, a receiver (decoder) 42 for receiving the packets of digital signals from the other stations, and a terminal controlling unit 43 for controlling the terminal. The signal output from the transmitter 41 is temporarily stored in a transmission buffer memory 51. And the signals are read out together at the appointed time by clock signals (not shown) which have a frequency corresponding to the transmission speed on the coaxial cable 1. The read-out signal is converted to the appointed packet by a transmission logical circuit 52. And after the packet passes through a transmission buffer amplifier 53, it is transmitted on the coaxial cable 1 through the T connection $3_1$.

On the other hand, all packet signals transmitted on the coaxial cable 1 are received by a reception buffer amplifier 54 through the T connection $3_1$. A reception logical circuit 55 selects only the packets addressed to the receiving station, and temporarily stores the selected packets in a reception buffer memory 56. The stored signals are continuously read out by using the appointed clock in the receiver 42. Thereby, the receiving output signal is obtained.

As mentioned above, the transmission and reception of the signal are performed, and further the transmitting clock used therein is generated from the transmitting clock oscillator 57. The transmitting clock is divided by the frame counter 58, and the block timing and the frame timing signals are formed and supplied to logic circuit 52. A transmission controlling circuit 59 controls the terminal controlling unit 43 in response to the received signal addressed to the station and selected by the reception logical circuit 55. Circuit 59 also controls the transmission logical circuit 52 according to the indication of the terminal controlling unit 43. A collision detecting circuit 61 receives incoming and outgoing packets and detects whether there is a collision between packets of other stations and the local station.

In this digital signal transmitting method, if no stations are transmitting packets, there will be no frame and block signals transmitted and nothing will appear on the cable. Therefore, in this method, the initiative in the frame synchronism and the block synchronism is taken by the station which first transmits a packet. When the very first station transmits a packet, the other stations coordinate their block and frame timing on the basis of the packet from the very first station during that time. Each of the other stations will independently select vacant blocks and monopolize such blocks throughout the necessary time for transmission of their respective packet signals. When the very first station finishes communicating while the other stations are still performing transmitting, the station communicating at that time, takes the initiative of the frame synchronism, etc.

Relating to the parameter on the frame composition, the personal station can decide the following conditions, for example.

(1) Number of blocks per frame; N=120 channels
(2) Number of information bits per block; m=640 bits
(3) Number of bits of guard time plus overhead per block; g=120 bits
(4) Length of one block; B=m+g=760 bits
(5) Length of one frame; L=N×B=91,200 bits Generally, the digitized aural signal (so-called PCM) has a transmitting speed of 64 Kbps (bit/sec.). Accordingly, in order to perform the transmission of digital signal under the condition indicated above (2), the following conditions are also determined.

(6) Channel capacity per block; Co=64 Kbps
(7) Frame repeating frequency; F=Co/m=100 Hz
(8) Frame period; Tf=1/F=10 ms
(9) Transmitting speed on cable; R=L/Tf=9.12 Mbps The realization of the packets satisfying the above conditions is backed up by the general technical records relating to the packet switching, and no problem can be found.

Hereinafter, relating to this digital signal transmitting method, some problems are explained in order.

First of all, the treatment in the case when the packet signal transmitted to the coaxial cable 1 initially collides with a packet signal transmitted from another station will be described. When no station is transmitting, any personal station can start its packet transmission at a completely arbitrary time and on equal terms. When a plurality of stations start transmitting their packets unexpectedly at the same time, the transmitting signal and receiving signal are input to the collision detecting circuits of these stations at the same time. Thereby the collision detecting circuit 61 detects the collision of packets and stops the transmission of the packet from the station where the collision is detected. Then, a random number is generated from a random number generator (not shown in the drawing), and after a period of time based on the random number has passed, the station again transmits its packet signal. Consequently, the station transmitting the signal first monopolizes the first block #1, and has the initiative of the system frame synchronization.

All the other stations including the station having been deferred by the collision of packets, receive the packet from the very first station, and thereby they establish the frame synchronism at the receiving side. A more concrete explanation will be made hereafter.

Thus, all stations can watch the condition of the signals transmitted on the coaxial cable 1 once the frame synchronism is established. Because the user unit 4 of the personal station is provided with a memory (not shown in the drawing) for indicating the state of monopolization of blocks in the frame, and the registration of the respective vacant blocks are performed on the basis of the packet signals of the personal stations received by the reception buffer amplifier 54. Accordingly, at a step when a station deferred by the collision of packets transmits its packet signal, that station will select a vacant block in the established frame, and will transmit its packet signal monopolizing the selected block until transmission termination.

The above explanation has been made on the premise that all personal stations have equal priority in transmitting their packets following a collision of packets. However, it is also possible to have a priority relating to the collision of packets. In that case, the transmission of a packet of higher priority will be continued, and the other station will wait before continuing transmission of its packet signal.

A second point for consideration pertains to the instantaneous timing to start the transmission of packet signals by the other stations when a first station on the coaxial cable 1 performs the transmission of one block per one frame. The packet signal transmitted on the coaxial cable 1 from any station is received by the other stations at different times depending on the propagation delay time on the cable. Therefore, if the other stations transmit their packets without considering the transmission time delays there may be further overlapping of packets on the cable.

Figure 3:
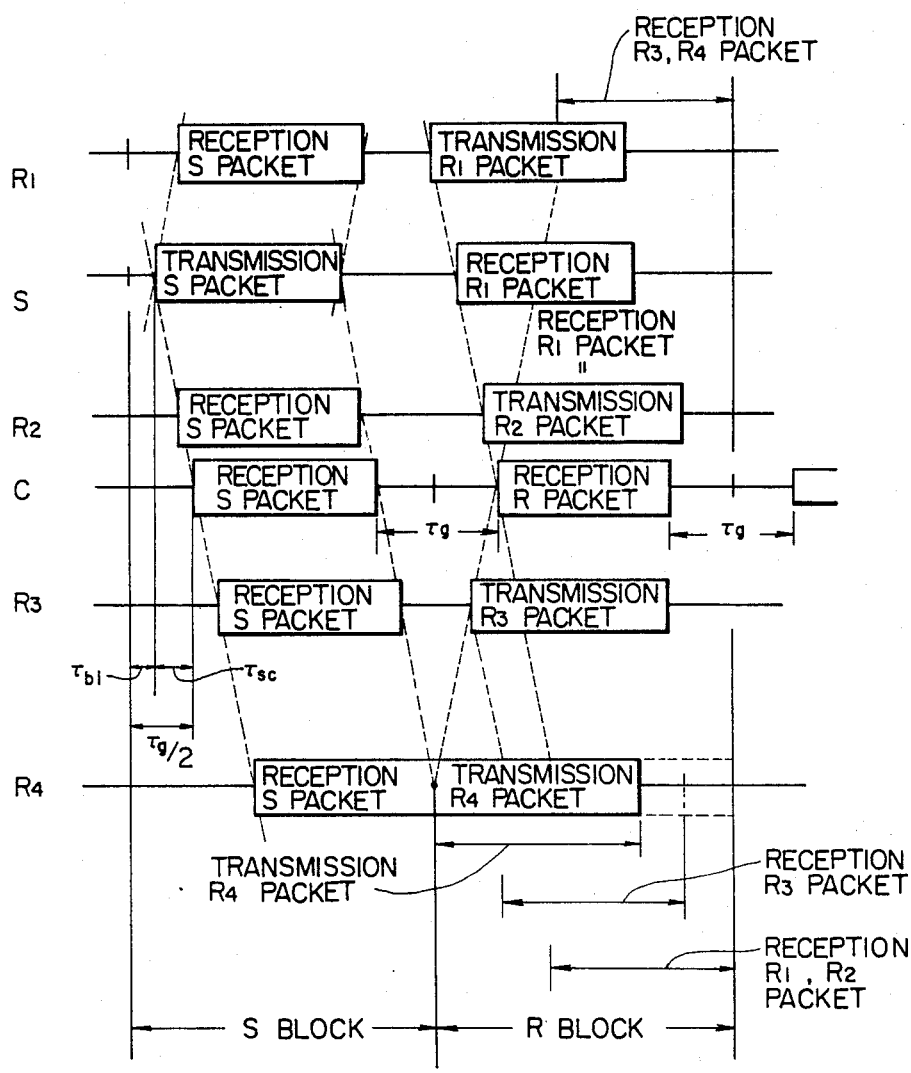
FIG. 3 is a timing chart illustrating the position of personal stations on a cable, and the envelope of signal wave form of transmitting and receiving packets in the receiving point (tap) of the respective personal stations.

In order to avoid the above problem, the conception of the above-mentioned guard time is introduced in this invention. Reference will be made to FIG. 3 wherein station S is considered to be the station which has performed the transmission of its packet signal and the stations R1–R4 are starting the transmission of their respective packet signals.

On the coaxial cable, these stations are arranged with the intervals of the distance as shown in the vertical direction in the drawing, and the station C, which is a reference, is positioned near the center of the cable. Further, the station R4 is positioned at the longest distance from the reference station C. In this case, the following personal stations R1–R4 determine the transmission timing of their respective packets such that the reception of their packets at station C starts one guard time after the station C terminates the reception of the packet (transmission S packet) from station S. That is, when the following personal stations R1–R4 transmit their packets in the vacant blocks, the timing is such that the respective packets are arranged with equal intervals at the receiving point of the reference station C.

The various stations determine their transmission timing in such a manner so as to insure that a guard time $\tau_g$ exists between the termination of one packet at station C and the start of the succeeding packet at station C. The stations know in advance the transmission delay times between stations. When the packet signal transmitted from station S is received at a station, the source address of the S packet is detected from the address field therein, and the time of the termination of the reception S packet at the receiving point of the station C is calculated from the relation of position of station S, station C, and the receiving station, and the relation of transmission delay time. The S packet termination at station C is later than that of the S packet termination at stations R1, R2 as shown in FIG. 3, and is earlier than that of the S packet termination at stations R3, R4.

Thus, the S packet termination point at station C is calculated for each of the stations R1–R4, under the condition that the station C is the reference. Thereafter the stations which want to transmit signals, start the transmission of their packet signals (transmission packet) at a time which takes into account the transmission delay time to the station C such that the packet signal transmitted will be received at station C at time delayed from the termination of the S packed by the guard time $\tau_g$.

Even if the stations R1–R4 start their transmissions as mentioned above, a collision of packets in the same block is possible if a plurality of stations transmit at the same time. In this case, the stations involved in the collision can monopolize the block by using the same method as the solution of the initial problem in starting the first transmission from silent stations of the system. When more vacant blocks exist than those the station intends to monopolize, it is also possible that the station designates the other vacant block by using, for example, the random number generator, and tries to monopolize it after the random waiting time has passed. In the case when the third or the following block in the frame is used, the packet transmission timing of a station is decided on the basis of the prior packet, and the vacant blocks are successively used.

As shown in FIG. 3, in the present digital signal transmitting method, the guard time $\tau_g$ is selected to be at least twice the transmission delay time from the reference station C to the farthest station. As shown in FIG. 1, the guard time comprises the backward guard time b1 and the forward guard time b9. Accordingly, when the interval from the middle point of the guard time $\tau_g$ existing at the respective receiving packets in the reference station C to the middle point of the next guard time $\tau_g$ is defined as the block timing which is common to the personal stations, it can be found that the packet of the block is existing therein without deviating from the block timing of the stations. This becomes the primary factor for the following points.

That is, when the station R or the following station transmits a packet, the station must confirm the existence of a vacant block. Because the purpose of this invention is to provide real time transmission such as conversation type aural transmission, this is essentially different from the signal transmission methods explained as the conventional technique. In order to achieve this purpose, it is necessary that when the right to use some block is once decided, the use of the block in the succeeding frames by the station obtaining the right to use should be guaranteed. Therefore, it is necessary that the station which wants to secure the block in use, should transmit idle information (idle bit) in the block even at the moment when there is no information to be transmitted. Further, the station which is going to start transmitting a packet signal, should identify the vacant block at least one frame before it begins transmitting, and starts transmitting the packet in the vacant block with the appointed timing. In order to confirm the vacant block, it in necessary that the existence of a packet in the block defined by the block timing should be guaranteed as mentioned above, therefore it is also necessary that the block synchronism and the frame synchronism are established in common for the personal stations.

As mentioned above, the bit timing of the respective packets on the coaxial cable 1 is individually decided by the transmitting clock oscillator 57 of the respective personal stations, and they are not synchronized with each other. However, it can be considered that the oscillation frequencies are equal to each other within the extent of error resulting from the stability thereof. Under these conditions, the block synchronism and the frame synchronism can be established by the following means.

First of all, in the case where no stations are transmitting packets, the respective stations divide the transmitting clock of 9.12 MHz from the transmitting clock oscillator 57 by 760. Thereby, the block timing 71 is formed. Further the block timing is divided by 120 to form the frame timing 72. In this state, the positioning of the frame and block is individually performed by the respective personal stations.

Now, assume that the request for transmission (calling) is made from the user unit 4 of the very first station S through the terminal controlling unit 43. The station S performs the selection of, for example, the first-block #1, with the frame and block timing previously obtained, and starts the transmission of a packet after $\tau_{b1}$ (backward guard time) from the starting time of the block. The time $\tau_{b1}$ is determined from the appointed guard time $\tau_g$ and the propagation delay time $\tau_{sc}$ from the station S to the station C, as follows:

$$\tau_{b1} = (\tau_g/2) - \tau_{sc}$$

Thereby, the block and frame timing of the station S becomes equal to that on the standard station C. As a matter of course, the station S is the station which performs the transmission of a packet to the coaxial cable 1 at the beginning. Thus station S can decide the timing of transmission in an arbitrary manner. However, for the economical system in which the device is commonly used in other cases, the decision of the backward guard time would be made as the above.

As mentioned above, when the transmission of a packet from the first station S is performed, the reception logical circuits 55 of all other stations will receive the signal and detect it. The reset signal 73 is applied to the frame counter 58 to control the block and frame synchronism. The frame and block synchronization is set at each station by resetting the counter 58 so that the start of block #2 coincides with the start of block #2 at station C. Note from FIG. 3, block #2 of the frame starts at exactly $\tau_g/2$ following the end of S packet reception at station C. The other stations calculate this exact point in time from the end of their own reception of the S packet.

For station R2, which is between stations S and C, it resets counter 58 to block #2 at a point in time following its received S packet termination calculated as:

$$\tau_g/2 + \Delta_{R2 \cdot C}$$

where $\Delta_{x \to y}$ means the propagation delay from station x to station y.

For stations R3 and R4, which are outside station C, observing from station S, the reset time from the end of S packet reception, is calculated as:

$$\tau_g/2 - \Delta_{C \to R3} \text{(for R3)};$$

$$\tau_g/2 - \Delta_{C \to R4} \text{(for R4)}.$$

For station R1, which is on the other side of station S from station C, the reset time from the end of S packet reception is calculated as:

$$\tau_b/2 + \Delta_{S \to C} - \Delta_{S \to R1}$$

As mentioned above, when the packet signal is transmitted, all stations can synchronize the frame counter 58 with that of the station S. Even if the frame counters are once synchronized by the reset signal, a slight frequency difference caused by instability of the clock oscillators produces; lead or lag of the frame timing from that of station S as time passes. However, it is possible to control the lead or lag within a negligible extent by performing at least one reset per frame by using the packet signal from the station S, for example.

Once the start of block #2 (and for that matter all subsequent blocks) is synchronized in all stations, the stations can determine the time to start transmitting based on the start time of block #2, #3, #4, etc., and the delay between the station and station C. Specifically the start time for any station R will be equal to $\tau_g/2 - \Delta_{R \to C}$ following the block start time.

When the transmission from the very first station S, which temporarily operates as a key station, is terminated, the first block #1 becomes vacant. Then the station R which uses the second block #2, becomes the next key station as a substitute for the station S. That is, after the block #1 becomes vacant the frame counter 58 of the station R is not reset (i.e. free-running), but all other stations will synchronize to the frame timing of station R. All other stations including the station S form the reset signal 73 from the packet signal of the station R again, and reset their frame counters 58. In the same way, by sequentially changing the key station, the block and frame synchronism of the whole system can be secured. For this purpose, it is also feasible that the bit for declaring whether a transmitting station is the key station or not, is assigned in the overhead of the respective packet but this is not essential for this invention.

As explained above, according to this invention, in a multipoint communication system wherein the transmission and reception of the digital signal is performed through a plurality of taps disposed at arbitrary positions on the communicating cable, for example, of which both ends are terminated with the resistance value equal to the characteristic impedance, the signal transmitted on the communicating cable is fixedly positioned in the frame repeated periodically on a time base, and the signals of multiple stations are time division multiplexed and transmitted by a unit of blocks further divided in the frame, and the present invention has the following merits.

(1) The composition of the network is simple and economical.

(2) The common portion of the system is completely passive and has high reliability.

(3) Flexibility on the composition of the system is high.

(4) The bit timing among stations is independent and not necessarily synchronized.

(5) The transmission unit takes the packet format, but essentially it is circuit switched transmission. Accordingly, real time transmission, such as for conversation type aural transmissions, is made possible, and conventional data terminal can easily be connected to.

Though, in the exemplary embodiment, the number of blocks used by a personal station is one block per frame, the number of blocks is not restricted. That is, it is also possible for the personal stations to construct a packet by collecting two or more blocks together according to the quantity of information to be transmitted. In this case, the guard time is only established at the back and front of the packet by the appointed quantity, and it is not necessary to put the guard time between the collected blocks. Accordingly, the efficiency of transmission is relatively improved by alloting otherwise used guard time to the information bits.

Further, when the information for multiple blocks per frame is transmitted, it is also profitable that the blocks are dispersed with almost equal intervals, for example, in such manner that the first and the sixty-first blocks #1, #61, or the first, the forty-first, and the eighty-first blocks #1, #41, #81. That is, the capacity of transmission buffer memory and the reception buffer memory can be decreased by the above-mentioned form of use.

On the contrary, it is also possible to divide one or multiple blocks into several small blocks, and take the appointed guard time among the small blocks. According to this form, the data terminal with low speed, for example, about several Kbps, can be efficiently multiplexed.

Further, it is also possible that a specific block is assigned to a specific station at all times, and the specific station observes the system as the fixed key station, and becomes the central station for maintenance. Further, it is also possible to perform the assignment of blocks and assembly of packet suitable thereto, in order that more than two user units are used by the personal stations through one tap.

It is also effective that controlling sections for deciding the possibility of transmitting the packet signals are built into the personal stations, thereby when the number of blocks remaining in the frame just before the transmission of the packet signal is to be performed is less than those necessary for the transmission, the transmission of the packet signal is prohibited.

Further it is also effective for not performing the idle signal transmission that means for recognizing the calling station and the called station on block-by-block basis by every block from the address code, etc., of the receiving signal, are disposed to the respective personal stations, thereby when the station to which the digital signal is to be transmitted, is appointed by the other station and is in communication therewith, "Busy" is indicated, and the outgoing of the packet signal to the station is prohibited.

Furthermore, as shown in FIG. 1, the exemplary embodiment has been explained on the premise that the transmission of information is performed by the information bits (data unit) b6, but the redundant code for strengthening the overhead fields such as the address field (b4) and the control field (b5) can be inserted into the data unit during the period before and after the transfer of data, and during the transfer of data, the block number can be used together with the address code. According to this method, the misoperation of system caused by the bit error during the transmission, can be reduced to the minimum.

What is claimed:

1. In a multipoint communication network wherein a plurality of taps are disposed at arbitrary positions on a communicating cable whose end-to-end signal propagation time is long relative to a bit period, personal stations are connected to said communicating cable through said taps, and transmission and reception of digital signals are performed, a digital signal transmitting method comprising the steps of
determining at each of said stations the timing of a repeatable frame, said frame being subdivided into a plurality of successive blocks, and transmitting packets of information from said stations to said cable during blocks selected and monopolized by said stations to provide time division multiplexed signals on said cable, said determination based on already transmitted packets of information received by said stations and if no packets are being received said determination being set by the first station to transmit a packet.

2. The digital signal transmitting method as claimed in claim 1 wherein the step of transmitting comprises at each station, selecting an available block within said frame and timing the start of transmission of said station's packet at a time such that said packet arrives at an appointed station at a fixed guard time following the start of said selected block within the frame and block timing of said appointed station.

3. The digital signal transmitting method as claimed in claim 1 further comprising the steps of, detecting, at each station, during a received frame just prior to packet transmission from said station, the number of available blocks within said frame, and prohibiting transmission of a packet if the number of available blocks is insufficient.

4. The digital signal transmitting method as claimed in the claim 1 further comprising the steps of, detecting prior to packet transmission from a first station to a destination station whether said destination station is occupied, and if so, prohibiting packet transmission from said first station to said destination station.

5. The digital signal transmitting method as claimed in claim 1 wherein in the time before or after the transfer of data, but during the time allocated to the transfer of data, an overhead field is inserted for preventing a bit error in a first field positioned in the block outside the position allocated to the transmission of data in the block whereby the first field and its redundant overhead field are used together against eventual bit error.

6. The digital signal transmitting method as claimed in claim 1 further comprising the step of detecting, at each station, a collision of a transmitted packet from said station with a received packet from any other station.

7. The digital signal transmitting method as claimed in claim 1 wherein the step of transmitting packets comprises transmitting a packet from a station within multiple blocks in the same frame.

8. The digital signal transmitting method as claimed in claim 1 wherein the start of frame and block timing is decided by the station which is first to transmit a packet on a previously empty communicating cable, and wherein after said station has stopped transmitting its packet, the station which occupies a subsequent block at that time, decides the start of frame and block timing.

9. The digital signal transmitting method as claimed in claim 1 wherein a specific one of said station always has access to block #1 of every frame, and said specific station decides the relation of the position among the frame and the blocks on time base at all times.

* * * * *